(12) United States Patent
Rayner et al.

(10) Patent No.: US 6,180,244 B1
(45) Date of Patent: Jan. 30, 2001

(54) WATERBASED THERMOFORMING ADHESIVES

(75) Inventors: Terry J. Rayner; Arianne E. McCarthy, both of London (CA)

(73) Assignee: 3M Innovative Properties Company, St. Paul, MN (US)

(*) Notice: Under 35 U.S.C. 154(b), the term of this patent shall be extended for 0 days.

(21) Appl. No.: 09/024,237

(22) Filed: Feb. 17, 1998

(51) Int. Cl.⁷ .................. C09J 175/06; C09J 175/04; C09J 133/04

(52) U.S. Cl. .................. 428/424.8; 428/355 CN; 428/354; 428/423.1; 524/501; 524/507; 525/127

(58) Field of Search ............... 525/127; 524/501, 524/507; 428/355 CN, 354, 424.8, 423.1

(56) References Cited

U.S. PATENT DOCUMENTS

| | | |
|---|---|---|
| 4,175,161 | 11/1979 | Fogle et al. . |
| 4,762,880 | 8/1988 | Leung . |
| 4,853,061 | 8/1989 | Leung . |
| 4,870,129 | 9/1989 | Henning et al. . |
| 4,923,921 | 5/1990 | Chevalier et al. . |
| 4,948,829 | 8/1990 | Mitsuji et al. . |
| 4,968,373 | 11/1990 | Chevalier et al. . |
| 5,011,881 | 4/1991 | Fujii et al. . |
| 5,141,983 | 8/1992 | Hasegawa et al. . |
| 5,227,422 | 7/1993 | Mitsuji et al. . |
| 5,229,207 | 7/1993 | Paquette et al. . |
| 5,308,914 | 5/1994 | Wallon et al. . |
| 5,314,942 | 5/1994 | Coogan et al. . |
| 5,334,690 | 8/1994 | Schafheutle et al. . |
| 5,371,118 | 12/1994 | Bolte et al. . |
| 5,430,094 | 7/1995 | Gola et al. . |
| 5,449,559 | 9/1995 | Furlan et al. . |
| 5,455,293 | 10/1995 | Wood et al. . |
| 5,470,899 | 11/1995 | Gulbins et al. . |
| 5,523,344 | 6/1996 | Maksymkiw et al. . |
| 5,548,016 | 8/1996 | Provenzola . |
| 5,571,857 | 11/1996 | Gruber et al. . |
| 5,571,861 | 11/1996 | Klein et al. . |
| 5,574,083 | 11/1996 | Brown et al. . |
| 5,610,232 | 3/1997 | Duan et al. . |
| 5,624,758 | 4/1997 | Maksymkiw et al. . |
| 5,643,669 | 7/1997 | Tsuei . |
| 5,652,288 | 7/1997 | Wood et al. . |
| 5,652,299 | 7/1997 | Nakajima et al. . |
| 5,726,242 | 3/1998 | Kusuoka et al. . |
| 5,807,919 | * 9/1998 | Duan . |
| 5,834,554 | * 11/1998 | Duan . |
| 5,872,182 | * 2/1999 | Duan . |

FOREIGN PATENT DOCUMENTS

| | | |
|---|---|---|
| 28330/95 | 8/1995 | (AU) . |
| 2033740 | 1/1991 | (CA) . |
| 2155225 | 8/1995 | (CA) . |
| 0 794 203 A2 | 9/1997 | (EP) . |
| 2 285 980 | 8/1995 | (GB) . |
| 5-279647 | 10/1993 | (JP) . |
| 08188764 | 7/1996 | (JP) . |
| 08302315 | 11/1996 | (JP) . |
| WO 89/10380 | 11/1989 | (WO) . |
| WO 94/21743 | 9/1994 | (WO) . |
| WO 95/08583 | 3/1995 | (WO) . |
| WO 95/19231 | 7/1995 | (WO) . |
| WO 96/07540 | 3/1996 | (WO) . |
| WO 96/25453 | 8/1996 | (WO) . |
| WO 96/34740 | 11/1996 | (WO) . |
| WO 96/37569 | 11/1996 | (WO) . |
| WO 96/40811 | 12/1996 | (WO) . |
| WO 97/19121 | 5/1997 | (WO) . |

* cited by examiner

*Primary Examiner*—David J. Buttner
(74) *Attorney, Agent, or Firm*—Carolyn V. Peters

(57) ABSTRACT

The adhesive of this invention comprises of a combination of an anionic sulfonated polyester urethane dispersion, an acrylic/vinyl polyester urethane dispersion, a non-sulfonated polyester urethane dispersion, solvents and a rheology modifier combination capable of producing a cobweb type pattern while maintaining a uniform dispersion of the aforementioned materials.

14 Claims, No Drawings

WATERBASED THERMOFORMING ADHESIVES

TECHNICAL FIELD

This invention relates to adhesives, particularly to water-based adhesives for use in thermoforming automotive interior vehicle assembly operations, industrial lamination, marine components, recreational vehicle components and aerospace components.

BACKGROUND OF THE INVENTION

Production trends within automotive interior vehicle component assembly plants, for vacuum formed components, involve assembly operations that include as the bonding mechanisms: adhesives, glass reinforced urethane, and low pressure molding. These operations typically involve manufacturing of instrument panels (I/P's), side door panels, transmission covers, rear decks, air bag covers and headliners.

Component parts are composed of a rigid backing material with a decorative surface layer. The most common rigid backing substrates include, acrylonitrile-butadiene-styrene (ABS), acrylonitrile-butadiene-styrene blended with polycarbonate (ABS/PC), acrylonitrile-butadiene-styrene blended with styrene-maleic anhydride (ABS/SMA), polycarbonate blended with styrene-maleic anhydride (PC/SMA), pressed wood fiber, and Noryl™ (General Electric) (a blend of polyphenylene oxide (PPO) and hi-impact polystyrene (HIPS)). The most common decorative surface layers are vinyl substrates that include rigid, fabric backed, trilaminate, bilaminate and composite types. Trilaminate and bilaminate expanded vinyls (i.e. foams), as well as the composite vinyls have a coating applied to the back side of the vinyl, generally referred to as a backcoating. This backcoating improves adhesion between the vinyl and the component part. Further, if the vinyl substrates contain plasticizers, the backcoating may limit plasticizer migration. This backcoating may be a crosslinked or uncrosslinked polyurethane, polyvinylchloride/polyurethane (PVC/PU), acrylic or occasionally, an ethylene-acrylic acid based coating.

In typical vacuum forming applications, the adhesive is applied to the rigid substrate. It is preferred not to use an adhesive that requires a primer be applied onto the rigid substrate prior to application of the adhesive. A sheet of decorative expanded vinyl is heated above its memory point at which time the vinyl is brought into contact with the dried adhesive and a vacuum is applied. As used in this application, "memory point" is the temperature at which vinyl can be stretched over a contoured surface but still retain the structural integrity of the vinyl.

The temperature to which the vinyl is heated must be sufficient to allow conformability to the rigid surface as well as cause wetting of and bond formation with the dried adhesive. Subsequent to this, and upon removal of the vacuum, the adhesive must be able to pass the industry performance specifications, such as withstanding testing at 110° C. without allowing the vinyl to bridge recessed or deep draw areas. Also, the adhesive or bonding agent must meet the heat requirements of 82–115° C. for automotive interiors for the instrument panel (I/P), the rear deck, shelf area, and the door panel above seat level. Surface temperatures on the I/P can reach 110° C. and the adhesive is required to maintain performance in high humidity/warm environments, and withstand the effects of cold temperature cycling.

In order to meet this series of requirements adhesive formulators have used one or two component polyurethanes in solvents such as methylene chloride. Recent government regulations concerning exposure to chlorinated solvents, as well as isocyanates, have necessitated the development of water-based alternatives. Aromatic and aliphatic polyurethane dispersions with varying degrees of crystallinity, and crystallizing polyamide dispersions that may be modified with materials such as rapid setting ethylene-vinyl acetate emulsions to achieve the desired balance of properties have recently been made available as alternatives to the chlorinated solvent-based adhesives.

The use of crystallizing polyurethane dispersions for vacuum forming applications has been limited to rigid surfaces that possess some polarity such as ABS. The adhesion is inadequate for lower surface energy plastics such as Noryl. In addition the use of material modifiers for these polyurethane dispersions such as ethylene-vinyl-acetate emulsions have also demonstrated inadequate adhesion to lower energy surfaces.

Crosslinkers such as water dispersible isocyanates and aziridines have frequently been used in polyurethane dispersions to obtain the desired heat resistance. However, the adhesives currently available have not demonstrated the performance characteristics, as described above, of solvent-based adhesives.

SUMMARY OF THE INVENTION

Briefly, in one aspect of the present invention, a water-based adhesive, essentially plasticizer-free is provided, comprising a combination of (a) 15–85% by weight, most preferably 35–57% by weight sulfonated polyester urethane dispersion (b) 15–55% by weight, most preferably 25–37% by weight acrylate-vinyl dispersion (c) 0–50% by weight, the most preferably 6–17% by weight non-sulfonated urethane dispersion, (d) optionally 0–55% by weight, preferably 7–15% by weight non-acrylate vinyl dispersion, (e) optionally, 0–10% solvent by weight of the total formulation, preferably 0–5% by weight, (f) 0–1% by weight, preferably 0.15–0.25% by weight rheology modifier capable of producing textured patterns while maintaining a uniform dispersion of the aforementioned materials and (g) 0–7% by weight of the total formulation crosslinking agent.

Additives may be used, such as pigments, defoamers, antioxidants, coalescing agents, UV absorbers and the like. When used, such materials are present in amounts that are effective for the purpose for which they are well known to those skilled in the art. The percentages specified, with the exception of solvents, are based on percent solids of the components. As used in this application "total formulation" includes the combination of the solid components, the solvents and any water that may be present.

In another aspect of the present invention, an article, such as an automotive component is provided comprising a substrate (such as the molded automotive component), wherein the substrate is a plastic, such as Noryl™ (polyphenylene oxide modified with high impact styrene), ABS and other plastics, such as ABS/PC blends, ABS/SMA blends and PC/SMA blends, and coated thereon is a layer of plasticizer-free water based adhesive according to the present invention, and overlaying the adhesive layer, is a vinyl sheeting adhered to the substrate via the adhesive layer.

Advantageously, the water-based adhesives of the present invention exhibit performance characteristics and application attributes on par with the performance levels currently exhibited in alternative available solvent-based adhesives. These performance characteristics include the ability to be force-dried without affecting the low temperature activation profile of the adhesive, to exhibit a thermal response to the short term heat imparted from that retained in the vinyl, to achieve wetting and bond formation under low temperature conditions (typically in the range of 50–65° C.) often with an applied vacuum of about one (1) atmosphere present, and to exhibit diversity in the ability to bond to the various vinyl constructions and rigid substrates. The application attributes include a sprayable product to be used with conventional equipment without excessive overspray, theological performance that allows shear thinning at the spray gun head but permits a controlled raised or textured pattern on the rigid surface, rapid rigid surface wetting and adhesion while being non-destructive to any plastic surface, low odor, and non-HAPS (hazardous air pollutents) containing.

Furthermore, the present invention provides adhesives having low toxicity and therefore meets stringent government controls/regulations.

A particular advantage of the adhesives of the present invention is a unique set of performance characteristics useful in vacuum forming operations. Also, the adhesives of the present invention are able to meet the heat requirements of 82–115° C. for automotive interiors for the instrument panel (I/P), the rear deck, shelf area, and the door panel above seat level. Surface temperatures on the I/P can reach 110° C. and the adhesive is required to maintain performance in high humidity/warm environments, and withstand the effects of cold temperature cycling.

The requirement of adhering to low polarity, low surface functionality, low surface energy, hydrophobic surfaces, from the wet applied state, in addition to adhering to polar, possibly crosslinked, vinyl backcoatings from a partially softened state presents a challenge to water-based adhesives. Uniquely, the adhesives of the present invention demonstrate adhesion to Noryl™ (General Electric) plastics while meeting the requirements of the above-described vacuum forming process. Further, these adhesives also demonstrate the capability to forms bonds with other aromatic or styrene containing substrates.

This invention may also find utility in other thermo-laminating operations such as industrial, recreational vehicle, aerospace and marine laminating.

As used in this application:

"thermoforming" includes thermoforming, bladder press thermoforming, and vacuum assisted thermoforming;

"water-based adhesives" include adhesives containing up to approximately 10% solvent;

"solvents" as used in this application do not include water as a solvent; and

"dispersion(s)" includes both emulsion(s) and dispersion(s).

DESCRIPTION OF THE PREFERRED EMBODIMENT(S)

Water-based adhesives of this invention for use in vacuum/thermoforming automotive interior vehicle assembly operations comprise either a 1 part or 2 part adhesive that can form a crosslinked network, through the use of various water dispersible crosslinkers that react with hydroxyl, carboxylic or amino groups. In addition, coupling or non-coupling silanes, low softening point resins and rheology modifiers may also be included in the adhesives of the invention.

A water-based adhesive, essentially plasticizer-free is provided, comprising a combination of (a) 15–85% by weight, most preferably 35–57% by weight sulfonated polyester urethane dispersion (b) 15–55% by weight, most preferably 25–37% by weight acrylate-vinyl dispersion (c) 0–50% by weight, the preferably 6–17% by weight non-sulfonated urethane dispersion, (d) optionally 0–55% by weight, preferably 7–15% by weight non-acrylate vinyl dispersion, (e) 0–10% by weight of the total formulation, preferably 0–5% by weight solvent, (f) 0–1% by weight, preferably 0.15–0.25% by weight rheology modifier capable of producing textured patterns while maintaining a uniform dispersion of the aforementioned materials and (g) 0–7% by weight of the total formulation crosslinking agent.

Additives may be used, such as pigments, defoamers, antioxidants, coalescing agents, UV absorbers and the like. When used, such materials are present in amounts that are effective for the purpose for which they are well known to those skilled in the art.

The adhesives typically the uncrosslinked adhesives of the present invention have a storage modulus (G') in the range of $5\times10^8$ to $1\times10^9$ dynes/cm2 at 25° C. and at least $2\times10^6$ at 115° C. While the crosslinked adhesives of the present invention have a storage modulus (G') in the range of $1\times10^9$ to $2\times10^9$ dynes/cm2 at 25° C. and at least $3\times10^6$ at 115° C.

Particularly useful materials for the adhesive formulations of the present invention are described below.

Primary Adhesive Formulation Components

Sulfonated polyester urethane dispersions: Useful sulfonated polyester urethane dispersions include Dispercoll™ U-54, Dispercoll™ U-53 or Dispercoll™ KA-8756 (Bayer Corporation) and mixtures and combinations thereof. The sulfonated urethane dispersion preferably has storage modulus (G') characteristics of $2\times10^9$ to $5\times10^5$ dynes/cm$^2$ over the temperature range of 25° C. to 115° C.

Non-sulfonated urethane dispersions: Useful non-sulfonated urethane dispersions include Aquathane™ 97949 and 97959 (Reichold Chemicals), Flexthane™ 620 and 630 (Air Products and Chemicals), Luphen™ D DS 3418 and D 200A (BASF Corporation), Neorez™ 9617 and Neorez™ 9437 (Zeneca Resins), Quilastic™ DEP 170 and 172 (Merquinsa), and Sancure™ 1601 and 815 (B. F. Goodrich), and urethane-styrene polymer dispersions such as Flexthane™ 790 and 791 (Air Products & Chemicals Inc.), and non-ionic polyester urethane dispersions such as Neorez™ 9249 (Zeneca Resins). Furthermore, mixtures and combinations of various non-sulfonated urethane dispersions may also be used. The preferred non-sulfonated urethane dispersions are Aquathane™ 97949 Quilastic™ DEP 170, and Neorez™ 9617. Non-sulfonated urethane dispersions preferably have storage modulus (G') characteristics of $2\times10^9$ dynes/cm$^2$ at 25° C. and at least $6\times10^6$ dynes/cm$^2$ at 115° C.

Acrylate/vinyl dispersions: Acrylate/vinyl dispersions useful in the water-based adhesives of the invention, include acrylate or acrylic dispersions such as Jagotex™ KEA-5050 and KEA 5040 (Jager), Hycar™ 26084, 26091, 26315, 26447, 26450 and 26373 (B. F. Goodrich), Rhoplex™ AC-264, HA-16, B-60A, AC-234, E-358 and N-619 (Rohm and Haas Co.), silanated anionic acrylate-styrene polymer dispersions such as Acronal™ S-710 (BASF Corporation) and Texigel™ 13-057 (Scott Bader Inc.), anionic acrylate-styrene dispersions such as Acronal™ 296D, NX 4786, S-305D, S-400, S-610, S-702, S-714, S-728, and S-760 (BASF Corporation), Carboset™ CR-760 (B. F. Goodrich), Rhoplex™ P-376, P-308, and NW-1715K (Rohm & Haas), Synthemul™ 40402 and 40403 (Reichold Chemicals), Texigel™ 13-57, 13-034 and 13-031 (Scott Bader Inc.), and Vancryl™ 954, 937 and 989 (Air Products & Chemicals Inc.), anionic acrylate-styrene-acrylonitrile dispersions including materials such as Acronal™ S 886S, S 504, and DS 2285 X, and acrylate-acrylonitrile dispersions such as Acronal™ 35D, 81D, B 37D, DS 3390, and V275 (BASF Corporation). Furthermore, mixtures and combinations of various acrylate/vinyl dispersions may also be used. Most preferred acrylate/vinyl dispersions are silanated anionic acrylate-styrene polymer dispersions.

Non-acrylate vinyl dispersions: Useful non-acrylate vinyl dispersions include vinyl chloride-ethylene emulsions such as Vancryl™ 600, 605, 610 and 635 (Air Products and Chemicals Inc.); vinylpyrrolidone/styrene copolymer emulsions such as Polectron™ 430 (ISP Chemicals); carboxylated and non carboxylated vinyl acetate ethylene dispersions such as Airflex™ 420, 421, 426, 7200, and A-7216 (Air Products and Chemicals Inc.) and Dur-o-set™ E150, E-230 (ICI); vinyl acetate homopolymer dispersions such as Resyn™ 68–5799 and 25-2828 (ICI); polyvinyl chloride emulsions such as Vycar™ 460x45, 460x6 and 460x58 (B. F. Goodrich); polyvinylidene fluoride dispersions such as Kynar™ 32 (Elf Atochem); and ethylene acrylic acid dispersions such as Adcote™ 50T4990 and 50T4983 (Morton International). Furthermore, mixtures and combinations of various non-acrylate vinyl dispersions may also be used. The most preferred non-acrylate vinyl dispersions are vinyl acetate ethylene dispersions.

Other dispersions: in addition to the aforementioned dispersion materials some sulfonated polyester urethane dispersion may be replaced by materials such as polyamide dispersions including Micromid™ 121RC, 141L, 142LTL, 143LTL, 144LTL, 321RC and 632HPL (Union Camp Corporation), anionic carboxylated or non-carboxylated acrylonitrile-butadiene-styrene emulsions and acrylonitrile emulsions such as Hycar™ 1552, 1562x107, 1562x117 and 1572x64 (B. F. Goodrich), resin dispersions derived from styrene such as Tacolyn™ 5001 and Piccotex™ LC-55WK (Hercules), and resin dispersions derived from aliphatic and/or aromatic hydrocarbons such as Escorez™ 9191, 9241 and 9271 (Exxon), styrene-maleic-anhydride solutions prepared from SMA™ 1440 H or SMA™ 1000 (AtoChem) and catechol solutions (Aldrich Chemical) may also be used the present invention.

Additives and Modifiers

In addition to the components of the adhesives, described above, additives and modifiers may be added to the adhesive formulations to vary performance. Such additives and/or modifiers include low softening point resins, adhesion promoters, crosslinking agents, surfactants, coalescing agents, pigments, defoamers, antioxidants, UV absorbers, rheology modifiers. Furthermore, mixtures and combinations of various additives, including mixtures, blends and combinations of each component may also be used. These additives are present, if used in the formulations in amounts consistent with the known uses of these components.

Low softening point resins derived from any of pure monomer resins such as Piccolastic™ A5 (Hercules Inc.), aliphatic/aromatic resins such as Escorez™ 2520 (Exxon), hydrogenated pure aromatic resins such as Regalrez™ 1018 (Hercules Inc.), methyl esters of rosin and hydrogenated variations such as Abalyn™ and Hercolyn™ D (Hercules Inc.), modified rosin esters such as Aquatac™ 9041 (Arizona Chemical) and resins derived from hydroabietyl alcohol such as Abitol™ E (Hercules Inc.) may be used. Typically these materials are present in amounts ranging from 0–4% preferably 0–1.5% by weight.

Adhesion promoters include coupling and non-coupling silanes, such as Hydrosil™ 2627, 2776, 2781, CP-0320, and CP-0330 (Huls), and A-1170 (OSI Specialties), materials such as oxybisbenzoic acid (Aldrich Chemical), aminoacids such as L-proline, glycine, 4-hydroxyproline, L-lysine, and L-tyrosine (Aldrich Chemical), tannic acid (Aldrich Chemical), chlorinated polyolefins such as CP 347W and 343-1 (Eastman Chemicals), peroxide type materials including benzoyl peroxide, 2-butanone peroxide, t-butyl hydroperoxide, hydrogen peroxide and 2-pentanedione peroxide (Aldrich Chemical) may have utility in the present invention. Typically these materials are present in amounts ranging from 0–2% preferably 0–1% by weight.

Rheology modifiers include alkali soluble or swellable emulsions such as AcrySol™ ASE-60, ASE-75 and ASB-95NP, Acusol™ 810A (Rohm and Haas Co.), and Alcogum™ L-15, L-31 and L-37 (Alco Chemical), alkali soluble associative emulsions such as Alcogum™ SL-70 and 78 (Alco Chemical) or Acrysol™ TT-935 or RM-5 (Rohm and Haas Co.), and alkali swellable associative urethanes such as Polyphobe™ P-104, and P-106 (Union Carbide), and in addition, hydrophobically-modified urethane dispersions such as Nopco DSX 1514, 1550, 2000 EXP and 3000 EXP (Henkel Corporation) and Acrysol RM-825 (Rohm and Haas Co.). The preferred rheology modifiers are alkali soluble or swellable emulsions. Typically these materials are present in amounts ranging from 0–1% by weight preferably 0–0.5% by weight.

Useful surfactants include anionic surfactants such as Fluorad™ FC-129 (3M Company), sulfosuccinates such as Triton GR-5M (Union Carbide), phosphate esters such as Rhodafac PE-510 (Rhone Poulenc) and nonionic surfactants such as the Surfonyl acetylenic diols technology PSA-336, PSA-204, PSA-216 (Air Products), octyl and nonyl ethoxylates such as Igepal (Rhone Poulenc), Triton and Tergitol (Union carbide). Typically these materials are present in amounts ranging from 0–2% by weight preferably 0–0.5% by weight.

Applications such as non-automotive industrial lamination typically may or may not require the use of a crosslinking agent in the adhesives of the invention. For applications wherein there is an industry process requirement of relatively low temperature (50–65° C.) activation coupled with high (110° C.) temperature performance either a latent internal self-crosslinking mechanism or the addition of an external crosslinking agent is desirable.

While many crosslinking agents are useful in the present invention, the crosslinking agents that are particularly reactive with carboxylic group of the dispersions are more preferred. Useful crosslinking agents include aliphatic isocyanates such as Desmodur™ KA-8703 and XO-671 (Bayer Corporation), carbodiimides such as Ucarlink™ XL 29SE (Union Carbide), and epoxy dispersions such as Epi-Rez™ 5003-W-55 (Shell Chemical). Additional crosslinkers include titanates such as Tyzor™ TE (DuPont); modified glyoxal such as Sequa™ 700C and 755 (Sequa Chemicals), dihydrazides such as valine dihydrazide (VDH), isophtharic acid dihydrazide (IDH), and adipic acid dihydrazide (ADH) (Ajinomoto Inc.). Crosslinkers include aromatic isocyanates such as Desmodur™ XO-672 (Bayer Chemical), epoxy dispersions such as Epi-Rez™ 3510-W-60, Epi-Rez™ 6006-W-70, Epi-Rez™ WD-510, and Epi-Rez™ 3519-W-50 (Shell Chemical), and hydroxy oxime ether derivatives such as Heloxy™ 63, 68, and 107 (Shell Chemical) and melamines such as Cymel™ 303 and 301 (Cytec Industries). Tri- and multifunctional aziridines such as CX 100 (Zeneca Resins), QZ-43 (K. J. Quinn), zirconates such as ammonium zironium carbonate (Magnesium Electron Limited) may be used, although they are generally not suitable for use when processing conditions require heat. Typically crosslinkers, when used, are present in amounts ranging from 0–7% by weight of total formulation preferably 0–3% by weight of total formulation.

Particularly useful neutralizing materials for pH adjustments include alkyl amines such as triethylamine, and diethylamine, cyclic amines such as morpholine and N-methyl morpholine, alkanolamines such as ethylaminoethanol, diethanolamine, dimethylethanolamine, triethanolamine (Aldrich Chemical), and aminomethylpropanol available (Angus Chemical). Typically these materials are present in amounts ranging from 0–0.5% by weight of total formulation preferably 0–0.2% by weight of total formulation.

Solvents and Coalescing Agents

It is preferable that the present invention should not contain any solvent other than water. However, if the adhesives contain any solvents, the maximum percentage does not exceed 10%, preferably does not exceed 5% of the total formulation. Preferably, the solvent content is minimized. However, should a solvent be useful for enhancing performance of the current invention then the preferred solvents include aromatic solvents such as toluene and xylene (Chemcentral). The more preferred solvents include methyl amyl ketone, methyl isoamyl ketone, methyl isobutyl ketone (Eastman Chemical), and N-cyclohexyl-2-pyrrolidone and N-2-hydroxyethyl-2-pyrrolidone (ISP Chemical). The most preferred solvents include N-methyl pyrrolidone (NMP), N-ethyl pyrrolidone (NEP), 2-pyrol, (ISP Chemical), D-limonene (L. V. Lomas), and cyclohexanone (Allied Signal Chemical) and Oxsol™ 10 and 100 (Occidental Chemical).

Certain solvents can also function as coalascing agents and useful coalescing agents include the ethylene and propylene derived glycol ether solvents of which the most preferred are the propylene glycol ethers. The preferred coalescing agents include Dowanol™ diethylene glycol n-butyl ether (DB), ethylene glycol n-butyl ether (EB), ethylene glycol phenyl ether (EPh), and propylene glycol n-propyl ether (PnP) (Dow Chemical Co.). The more preferred coalescing agents include propylene glycol phenyl ether (PPh), propylene glycol n-butyl ether (PnB), and tripropylene glycol methyl ether (TPM) (Dow Chemical Co.). The most preferred propylene glycol ether solvents are Dowanol™ dipropylene glycol n-butyl ether (DPnB), tripropylene glycol n-butyl ether (TPnB), and dipropylene glycol methyl ether (DPM)) (Dow Chemical Co.).

In evaluating the water-based adhesives of the invention it was found that a raised particulate, textured or cobweb adhesive pattern produced superior results to a flat spray pattern.

The desirable application attributes of the adhesives of the invention include a sprayable product to be used with conventional equipment without excessive overspray, rheological performance that allows shear thinning at the spray gun head but permits a controlled raised or textured pattern on the rigid surface, rapid rigid surface wetting and adhesion while being non-destructive to any plastic surface, low odor, and preferably non-HAPS containing.

Preferred performance attributes of the adhesives of the invention include the ability to be force dried without affecting the low temperature activation profile, exhibit a thermal response to the short term heat imparted from that retained in the vinyl, achieve wetting and bond formation under low temperature conditions (typically in the range of 50–65° C.) often with an applied vacuum of about one (1) atmosphere present, and exhibit diversity in the ability to bond to the various vinyl constructions and rigid substrates. The adhesive preferably generates a high degree of green strength as soon as the vacuum is removed such that the vinyl's memory does not allow bridging or slippage of the vinyl in contoured areas such as the deep draw areas, the adhesive preferably exhibits some resistance to plasticizers. The ultimate bond performance, preferably is sufficient to meet the industry performance specifications ranging from 82–115° C., and preferably the adhesive maintains performance in high humidity/warm environments, and withstands the effects of cold temperature cycling.

The preferred adhesives of the present invention adhere to low polarity, low surface functionality, low surface energy, hydrophobic surfaces, from the wet applied state, in addition to adhering to polar, possibly crosslinked, vinyl backcoatings from a partially softened state.

In the process of preparing the plastic or plastic resin blends for molding of the interior vehicle component parts the base resins may contain additives such as glass transition temperature (Tg) enhancing materials, impact modifiers, plasticizers, antioxidants, stabilizers, pigments, mold release agents and adhesion promoters. Acrylonitrile-butadiene-styrene (ABS) resins offer a cost effective plastic that has the features of lower heat distortion temperatures (HDT), lower toughness and presents a bonding surface amenable to most adhesives. ABS may also be blended with styrene-maleic-anhydride (SMA) to increase HDT while maintaining surface functionality. The ABS/PC (polycarbonate) blends are used to improve toughness, and increase HDT while having better processability and lower cost than PC. The extent of improvement is dependent on the ratio of these materials and the percent soft segment in the ABS. As the level of PC increases the bonding surface becomes less amenable for adhesive bonding. PC may also be blended with styrene-maleic anhydride (SMA) to provide better toughness and ductility than SMA with better retention of aged high temperature properties. Noryl™ is a unique material in that it possesses the features of light weight, toughness and high heat distortion temperatures but is also very difficult to bond to. Literature shows that the blend of PPO-HIPS (high impact polystyrene) gives better processibility and toughness than PPO and better heat distortion than polystyrene (PS). While these surfaces are prone to attack by aromatic solvents they also present little in surface functionality for a water-based polymer to bond to. The low surface functionality may also contribute to the high advancing and receding contact angles in addition to the low surface tension reported to be in the range of 35–39 dynes/cm$^2$.

Adhesives of the present invention initially have a G' (storage modulus) below the vinyl G' to effect wetout and adhesion. Upon aging the adhesives develop a G' above that of the vinyl to prevent shear slippage or heat induced cleavage of the vinyl.

Vacuum/thermoforming lamination is a widely used process within the Automotive, Aerospace, Industrial, Marine and Recreational Vehicle marketplaces. Typical users within the automotive market involve Tier 1 suppliers to the major auto manufacturers. These sub-assemblers use vacuum/thermoforming adhesives to assemble interior vehicle components such as side door panels, dashboards and transmission covers. The most commonly used adhesives are chlorinated solvent-based isocyanate containing polyurethanes, although some two part water-based adhesives are available.

This invention is further illustrated by the following examples that are not intended to limit the scope of the invention. In the examples, all parts, ratios and percentages are by weight unless otherwise indicated. The following test methods were used to evaluate and characterize the water-based adhesive compositions produced in the examples. All materials are commercially available, for example from Aldrich Chemicals, unless otherwise indicated or described.

Test Methods

Peel samples were prepared to evaluate the performance characteristics of the adhesives of the present invention according to ASTM Specification D 903-93 on an Instron Model 1123. The samples were prepared by bonding vinyl sheeting to various plastics in a vacuum former. The plastic sheet size was 15.2 cm by 20.3 cm by 3 mm thick. The vinyl sheet size was approximately 25.4 cm by 30.5 cm. The adhesive was spray applied, using a suction feed type gun, onto the plastic material then dried at between 60–100° C. for 5 minutes. The vinyl was heated such that the bondline temperature achieved was in the range of 55–65° C., then a vacuum was applied to bond the vinyl to the plastic sheet.

Samples were tested after ambient aging periods of 20 hrs, 72 hrs, 7 days and after thermal aging at 70–80° C. for periods of 24 to 48 hrs. The plastics included Noryl™ 6100, Noryl™ 5545 and ABS. The vinyls included bilaminates from Sandusky Vinyl Products named SDX 8545, Sandex 2869 and SDX 4574-240-VK9.

The crosslinker evaluations involved the same process, however, contoured mirror housings were used made of Noryl™ plastic. The vinyl used was SDX 4575-240-VK9 in a sheet size of 28 cm by 35 cm. These contoured panels were aged a minimum of 72 hrs at ambient prior to testing for both heat resistance and heat/humidity resistance. Thermal resistance was conducted by slowly ramping up the temperature in an air flow oven and observing for lifting or slippage of the vinyl. The temperature was subsequently maintained at 105° C. for a minimum of 200 hrs. Heat/humidity resistance was conducted at 38° C./96% R.H. The contoured panels were observed for any loss of adhesion. "Pass" indicated no loss of adhesion and "Fail" indicated a significant loss of adhesion. "Edge lift" indicated a slight failure of adhesion at the edges of the component panels.

Comparative Example 1—Preparation

The Comparative Example 1 (C-1) was prepared by blending under stirrer agitation 22.0 grams of Dispercoll™ U-53 (40% solids), 15.72 grams of Neorez™ XR-9630 (38% solids), 7.39 grams of Neorez™ R-9320 (40% solids), 5.70 grams of Dur-o-set™ E-150 (55% solids), and 9.21 grams of Uniplex™ 108 (100% solids sulfonamide plasticizer). The example was then neutralized to pH 7.9 with triethylamine. The resulting material was a low viscosity uniform dispersion. The Neorez™ XR-9630 and the Neorez™ R-9320 are both anionic aliphatic polyester urethane dispersions of differing Tg and tensile strength obtained from Zeneca™ Resins. Uniplex™ 108 is an N-ethyl o/p-toluene sulfonamide obtained from Unitex Chemical Corporation. Dur-o-set™ E-150 is a vinyl-acetate-ethylene dispersion of Tg 11° C. obtained from ICI.

C1 contained a sulfonated polyester polyurethane dispersion and plasticizer, but did not contain an acrylate/vinyl dispersion.

Peel samples of vinyl sheet to plastic sheet were prepared and tested as described above. Peel adhesion is reported in Table 1a and 1b.

Comparative Example 2—Preparation

The Comparative Example 2 (C-2) was prepared by blending under stirrer agitation 62.5 grams of Airlfex™ 7200 (73% solids) to a suitable container. Then under stirrer agitation, neutralizing this material with 0.33 grams of triethanolamine to a pH of 7.96. To this dispersion was added 10.06 grams of Dispercoll™ U 54 (50% solids) and 0.05 grams of triethanolamine was used to adjust the pH to 8.10. The resulting material was a low viscosity uniform stable dispersion. Airflex™ 7200 is a high solids vinyl acetate ethylene dispersion from Air Products and Dispercoll™ U 54 is a sulfonated polyester urethane dispersion from Bayer Corporation.

C2 contained a sulfonated polyester polyurethane and high proportion of vinyl acetate ethylene dispersion and did not contain an acrylate/vinyl dispersion.

Tables 1a and 1b illustrate the adhesion of a number of adhesives on Noryl™ (General Electric) and ABS plastics. Bostik 8805 is a commercially available one-component water-based adhesive described as modified polyurethane for thermal laminating operations, believed to be modified with vinyl-acetate ethylene. Bostik 8800 is a commercially available two-component modified polyurethane water-based adhesive for bonding vinyl to ABS by heat activation. This adhesive is believed to be modified with a vinyl-acetate ethylene and butyl benzyl phthalate. The Tables show that only the solvent based product met the adhesion requirements and that the water-based controls had unacceptable adhesion values to lower energy surfaces.

TABLE 1a

| | Comparative Examples | | | | | |
|---|---|---|---|---|---|---|
| | C-1 | C-1 | C-2 | C-2 | Bostik 8805 | Bostik 8800 |
| Condition | VK9 to Noryl 6100 | VK9 to ABS 6100 | VK9 to Noryl 6100 | VK9 to ABS | SDX 8545 to Noryl 6100 | |
| 20 hr 23° C. | 1.0 piw | 12.1 piw | 6.6 piw | 11.2 piw | 2.7 piw | 1.2 piw |
| failure mode | AF Nory | AF vinyl | AF Noryl | AF vinyl | AF Noryl | AF Noryl |
| 1 wk 23° C. | 1.2 piw | *foam tear | 2.3 piw | 12.6 piw | 1.4 piw | 1.0 piw |
| failure mode | AF Noryl | | AF Noryl | AF vinyl | AF Noryl | AF Noryl |

*foam tear refers to tearing of the expanded layer of the decorative vinyl bilaminate material
AF Noryl ™ indicated adhesive failure to Noryl ™
AF vinyl indicated adhesive failure to vinyl
Bostik 8805 - water-based modified polyurethane, available from Bostik
Bostik 8800 - water-based 2 component modified polyurethane, available from Bostik

TABLE 1b

Comparative Examples

| Condition | 4408 Adh. SDX 8545 to ABS | 4408 Adh. VK9 to Noryl 6100 | 4408 Adh. SDX 2869 to Noryl 6100 | 4408 Adh. SDX 8545 to Noryl 6100 |
|---|---|---|---|---|
| 20 hr 23C | 8.1 piw | 10.1 piw | 9.2 piw | 7.1 piw |
| failure mode | foam tear | foam tear | foam tear | foam tear |
| 1 wk 23C | 10.8 piw | 12.9 piw | 9.1 piw | 10–14 piw |
| failure mode | foam tear | foam tear | foam tear | foam tear | piw pounds per inch width 180 degree peel
4408 - solvent based polyurethane adhesive, available from 3M Company.

EXAMPLES 1–9

The composition of the present invention was prepared by blending the different dispersions, one after another, under high shear mixing. If solvent(s) and other minor components were necessary they were added to the blend, during agitation, and thoroughly mixed until a homogeneous dispersion was obtained. Adjustment of the pH was done at this point to achieve the desired pH range of 7.8–8.5. The adhesive was mixed for an additional 20 minutes. The adhesives were used immediately or stored for subsequent use.

The specific formulations are set forth in Tables 2a and 2b. All weights in Tables 2a and 2b are wet weights. Examples 1–2 represent a series of formulations all that exhibited adhesion to the resin modified Noryl™ (General Electric) plastic. Formulations 4–9 represent adhesive modifications that exhibit adhesion to both Noryl™ 6100 and the vinyl backcoating and that meet the required automotive ambient peel specification. These modifications would also be suitable for bonding to the Noryl™5545 or Noryl™5535 grades and other aromatic or styrene containing plastics.

Peel samples of vinyl sheet to plastic sheet were prepared and tested as described above. Results are reported in Tables 2c to 2e.

TABLE 2a

Examples

| Component | Example 1 | Example 2 | Example 3 | Example 4 |
|---|---|---|---|---|
| Dispercoll U54 | 40 | 39.5 | 47.93 | 41.62 |
| Neorez 9617 | 14.3 | 14.1 | 7.60 | 14.86 |
| Synthemul 40402 | 40.7 | 40.4 | — | — |
| Acronal S-710 | — | — | 27.95 | 27.32 |
| Acronal 610 | — | — | — | — |
| Acronal S-504 | — | — | 12.03 | 11.75 |
| Acronal DS 2285 | — | — | — | — |
| Airflex 7200 | — | — | — | — |
| ASE-95NP | — | — | 0.47 | 0.45 |
| Dowanol DPnB | 5.0 | 5.0 | 0.79 | 0.78 |
| D-limonene | — | — | 0.79 | 0.78 |
| 2-Pyrol | — | — | — | — |
| NEP | — | — | 2.43 | 2.43 |
| Desmodur KA-8703 | — | 1.0 | — | — |

TABLE 2b

Examples

| Component | Example 5 | Example 6 | Example 7 | Example 8 | Example 9 |
|---|---|---|---|---|---|
| Dispercoll U54 | 35.54 | 41.62 | 35.56 | 35.56 | 39.02 |
| Neorez 9617 | 21.76 | 14.86 | 21.77 | 21.77 | 23.89 |
| Synthemul 40402 | — | — | — | — | — |
| Acronal S-710 | 26.17 | 27.32 | 23.72 | — | 12.54 |
| Acronal 610 | — | — | — | 23.72 | — |
| Acronal S-504 | 11.96 | — | — | — | — |
| Acronal DS 2285 | — | 11.75 | 14.38 | 14.38 | — |
| Airflex 7200 | — | — | — | — | 20.05 |
| ASE-95NP | 0.55 | 0.45 | 0.55 | 0.55 | 0.49 |
| Dowanol DPnB | 0.79 | 0.78 | 0.79 | 0.79 | 0.80 |
| D-limonene | — | 0.78 | — | — | 0.80 |
| 2-Pyrol | 0.79 | — | 0.79 | 0.79 | — |
| NEP | 2.44 | 2.43 | 2.44 | 2.44 | 2.42 |
| Desmodur KA-8703 | — | — | — | — | — |

Dispercoll ™ U54 (55% solids) - Bayer Corp. - anionic sulfonated aliphatic polyurethane dispersion
Neorez ™ 9617 (35% solids) - Zeneca Resins - anionic aliphatic polyurethane dispersion
Synthemul ™ 40402 (49% solids) - Reichold Chemical - carboxylated styrene-acrylic disperison Tg 10° C.
Acronal ™ S710 (50% solids) - BASF - anionic silanated acrylate-styrene dispersion Tg 24° C.
Acronal ™ S504 (50% solids) - BASF - anionic acrylate-styrene-acrylonitrile dispersion Tg 11° C.
Acronal ™ S-610 (50% solids) - BASF - anionic acrylate-styrene dispersion Tg 8° C.
Acronal ™ DS 2285 (50% solids) - BASF - anionic acrylate-styrene-acrylonitrile dispersion Tg 7° C.
Airflex ™ 7200 (73% solids) - Air Products - vinyl acetate ethylene emulsion Tg 0° C.
D-limonene (solvent) - L.V. Lomas - DL-methyl-4-isopropyl-1-cyclohexane
2-Pyrol (solvent) - ISP Technologies - 2-pyrrolidone
NEP (solvent) - ISP Technologies - N-ethyl-2-pyrrolidone
ASE 95NP (18% solids) - Rohm & Haas - high MW alkali swellable acrylic emulsion
Desmodur ™ KA-8703 (100% solids) - Bayer Corp - hexamethylene diisocyanate based polyisocyanate

TABLE 2c

1800 Peel Adhesion to Noryl ™

| Component | Example 1 | Example 2 | Example 3 | Example 4 |
|---|---|---|---|---|
| 20 hr ambient | 6.4 piw | 13.0 piw | 7.2 piw | 8.5 piw |
| Failure mode | 10% Noryl | foam tear | 10% Noryl sl. foam tear | 25% Noryl sl. foam tear |
| 1 wk ambient | 8.9 piw | 13.6 piw | — | — |
| Failure mode | 20% Noryl | foam tear | | |

TABLE 2d

180° Peel Adhesion to Noryl ™

| Component | Example 5 | Example 6 | Example 7 | Example 8 | Example 9 |
|---|---|---|---|---|---|
| 20 hr ambient | 8.8 piw | 5.9 piw | 7.2 piw | 10.8 piw | 7.1 piw |
| Failure mode | sl. foam tear | 10% noryl sl foam tear | sl. foam tear | 50% noryl foam tear | 10% noryl |
| 1 wk ambient | 9.5 piw | — | 9.3 piw | 12.4 piw | — |

TABLE 2d-continued

180° Peel Adhesion to Noryl ™

| Component | Example 5 | Example 6 | Example 7 | Example 8 | Example 9 |
|---|---|---|---|---|---|
| Failure mode | sl. foam tear | | sl. foam tear | | 60% noryl foam tear |

TABLE 2e

180° Peel Adhesion to ABS

| | Example 3 | Example 4 | Example 5 | Example 6 | Example 9 |
|---|---|---|---|---|---|
| Component | | | VK9 Vinyl to ABS | | |
| 20 hr ambient | 9.8 piw | 8.5 piw | 10.2 piw | 7.8 piw | 7.6 piw |
| failure mode | sl. foam tear | sl. foam tear | sl. foam tear | sl. foam tear | mod. foam tear |
| Aged 72 hr @ 70° C. | 14.6 piw | 14.8 piw | 15.1 piw | 17.1 piw | |
| failure mode | Foam tear | Foam tear | Foam tear | Foam tear | Foam tear |

EXAMPLES 10–21

Tables 3a and 3b illustrate additional examples of formulations of the current invention. The samples are prepared as described above in the Example 1, except that a crosslinker is added. The low activation temperature requirement of this adhesive has the impact of requiring the addition of a crosslinker to meet the heat resistance specification. The crosslinkers were added just prior to use of the invention. The invention was sprayed onto the contoured Noryl™ mirror housings and dried in a forced air oven. The vinyl was subsequently heated so as to achieve a bond line temperature of 55–60° C. and a vacuum applied during the bond formation step on a vacuum former. Samples were test for heat resistance as described above. Results are given in Tables 3c and 3d except for Examples 10 and 21 that exhibited edge lift at 80–85° C.

TABLE 3a

Heat resistance Examples

| Component | Ex. 10 | Ex. 11 | Ex. 12 | Ex. 13 | Ex. 14 | Ex. 15 |
|---|---|---|---|---|---|---|
| Dispercoll U-54 | 35.6 | 35.0 | 35.0 | 35.1 | 34.8 | 34.8 |
| Neorez 9617 | 21.8 | 21.4 | 21.1 | 21.5 | 21.3 | 21.3 |
| Acronal S710 | 26.7 | 26.2 | 25.9 | 26.3 | 26.1 | 26.1 |
| Acronal S504 | 11.4 | 11.3 | 11.1 | 11.3 | 11.2 | 11.2 |
| Alco SL-78 | — | 0.18 | 0.18 | 0.18 | 0.18 | 0.18 |
| ASE 95NP | 0.55 | 0.55 | 0.54 | 0.55 | 0.54 | 0.54 |
| DPnB | 0.8 | 0.8 | 0.8 | 0.8 | 0.8 | 0.8 |
| Cyclohexanone | — | 0.8 | 0.8 | 0.8 | 0.8 | 0.8 |
| 2-Pyrol | 0.8 | — | — | — | — | — |
| NEP | 2.4 | 2.4 | 2.4 | 2.4 | 2.4 | 2.4 |
| Cythane 3174 | — | 1.3 | 2.6 | — | — | — |
| KA-8703 | — | — | — | 1.0 | 2.0 | — |
| XL 29SE | — | — | — | — | — | 1.9 |
| 3510-W-60 | — | — | — | — | — | — |
| 5003-W-55 | — | — | — | — | — | — |
| Heloxy 107 derivative | — | — | — | — | — | — |

TABLE 3b

Heat resistance Examples

| Component | Ex. 16 | Ex. 17 | Ex. 18 | Ex. 19 | Ex. 20 | Ex. 21 |
|---|---|---|---|---|---|---|
| Dispercoll U-54 | 34.1 | 34.9 | 34.3 | 34.8 | 34.2 | 35.2 |
| Neorez 9617 | 20.9 | 21.3 | 21.0 | 21.3 | 20.9 | 21.6 |
| Acronal S710 | 25.6 | 26.1 | 25.7 | 26.1 | 25.6 | 26.4 |
| Acronal S504 | 11.0 | 11.3 | 11.1 | 11.2 | 11.0 | 11.4 |
| Alco SL-78 | 0.18 | 0.18 | 0.18 | 0.18 | 0.18 | 0.18 |
| ASE 95NP | 0.53 | 0.54 | 0.54 | 0.54 | 0.53 | 0.48 |
| DPnB | 0.8 | 0.8 | 0.8 | 0.8 | 0.8 | 0.8 |
| Cyclohexanone | 0.8 | 0.8 | 0.8 | 0.8 | 0.8 | — |
| 2-Pyrol | — | — | — | — | — | 0.8 |
| NEP | 2.4 | 2.4 | 2.4 | 2.4 | 2.4 | 2.4 |
| Cythane 3174 | — | — | — | — | — | — |
| KA-8703 | — | — | — | — | — | — |
| XL 29SE | 3.8 | — | — | — | — | — |
| 3510-W-60 | — | 1.6 | 3.2 | — | — | — |
| 5003-W-55 | — | — | — | 1.7 | 3.6 | — |
| Heloxy 107 derivative | — | — | — | — | — | 0.9 |

Dispercoll ™ U54 (55% solids) - Bayer Corp. - anionic sulfonated aliphatic polyurethane dispersion
Alco ™ SL-78 (40% solids) - Alco Chemical - rheology modifier
Neorez ™ 9617 (33% solids) - Zeneca Resins - anionic aliphatic polyurethane dispersion
Acronal ™ S710 (50% solids) - BASF - anionic silanated acrylate-styrene dispersion Tg 24° C.
Acronal ™ S504 (50% solids) - BASF - anionic acrylate-styrene-acrylonitrile dispersion Tg 11° C.
2-Pyrol (solvent) - ISP Technologies - 2-pyrrolidone
cyclohexanone (solvent) - Chemcentral
NBP (solvent) - ISP Chemicals - N-ethyl-2-pyrrolidone
ASE 95NP (18% solids) - Rohm & Haas - high MW alkali swellable acrylic emulsion
Cythane ™ 3174 (74% solids) - Cytec - TMXDI/TMP adduct
Desmodur ™ KA-8703 (100% solids) Bayer Corp - hexamethylene diisocyanate based polyisocyanate
Ucarlink ™ XL 29SE (50% solids) - Union Carbide - multifunctional carbodiimide
Epi-Rez ™ 3510-W-60 (60% solids) - Shell - bisphenol A epoxy dispersion
Epi-Rez ™ 5003-W-55 (55% solids) - Shell - bisphenol A/bisphenol A novolak epoxy dispersion
Heloxy ™ 107 (27% solids) derivative prepared per U.S. Pat No. 5,527,944 assigned to BASF Tables 3c and 3d show that with the judicious selection of crosslinkers that the current invention maintains a strong bond under conditions of high temperature (105° C.) for prolonged periods without loss of adhesion or allowing the vinyl to slip. The invention further maintains this strong bond under conditions of high humidity and temperature (38° C./96% R.H.) over prolonged periods of time while in a contoured shape. The bonds exhibited foam tear when attempting to separate the vinyl from the Noryl™ surface.

TABLE 3c

Performance Results

| Condition | Ex. 11 | Ex. 12 | Ex. 13 | Ex. 14 | Ex. 15 |
|---|---|---|---|---|---|
| 20 hrs @ 105° C. | Partial edge lift | Partial edge lift | Slight edge lift | Pass | Pass |
| 48 hrs @ 105° C. | Fail | Fail | Partial edge lift | v. slight edge lift | Pass |
| 116 hrs @ 105° C. | Fail | Fail | Fail | Partial edge lift | v. slight edge lift |
| 200 hrs @ 105° C. | Fail | Fail | Fail | Partial edge lift | v. slight edge lift |
| 430 hrs @ 38° C./96% R.H. | N/d | N/d | n/d | no change | no change |

Example 10 exhibited edge lift @ 80–85° C.

TABLE 3d

Performance Results

| Condition | Ex. 16 | Ex. 17 | Ex. 18 | Ex. 19 | Ex. 20 |
|---|---|---|---|---|---|
| 20 hrs @ 105° C. | Pass | Partial edge lift | partial edge lift | v. slight edge lift | v. slight edge lift |
| 48 hrs @ 105° C. | Pass | Fail | partial edge lift | v. slight edge lift | v. slight edge lift |
| 116 hrs @ 105° C. | Pass | Fail | partial edge lift | slight edge lift | Slight edge lift |
| 200 hrs @ 105° C. | Pass | Fail | Partial + edge lift | partial edge lift | Slight edge lift |
| 430 hrs @ 38° C./96% R.H. | Pass | N/d | no change | partial + edge lift | no change |

Example 21 exhibited edge lift @ 80–85° C.

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A plasticizer-free water-based adhesive comprising:
   (a) 15–85% by weight sulfonated polyester urethane dispersion;
   (b) 15–55% by weight acrylate-vinyl dispersion or combinations of more than one acrylate-vinyl dispersion; and
   (c) 6–17% by weight non-sulfonated urethane dispersion or combinations of more than one non-sulfonated urethane dispersion.

2. The plasticizer-free water-based adhesive according to claim 1, wherein the sulfonated polyester urethane dispersion is an aliphatic sulfonated polyester urethane dispersion, aromatic sulfonated polyester urethane dispersion or mixtures and combinations thereof.

3. The plasticizer-free water-based adhesive according to claim 1 further comprising 7–15% by weight non-acrylate vinyl dispersion.

4. The plasticizer-free water-based adhesive according to claim 1, wherein the acrylate vinyl dispersion is an acrylate/styrene dispersion, a silanated acrylate/styrene dispersion, an acrylate/styrene acrylonitrile dispersion or combinations thereof.

5. The plasticizer-free water-based adhesive according to claim 1 further comprising solvent in an amount of not greater than 10% by weight.

6. The plasticizer-free water-based adhesive according to claim 1, wherein the non-sulfonated urethane dispersion is an anionic aliphatic polyurethane dispersion.

7. The plasticizer-free water-based adhesive according to claim 1, further comprising up to 0–55% by weight non-acrylate vinyl dispersion.

8. The plasticizer-free water-based adhesive according to claim 1, further comprising up to 0–10% solvent by weight of the total formulation.

9. The plasticizer-free water-based adhesive according to claim 1 further comprising up to 1% of a rheology modifier by weight.

10. The plasticizer-free water-based adhesive according to claim 1 further comprising up to 7% of a crosslinking agent by weight of the total formulation.

11. The plasticizer-free water-based adhesive according to claim 1, wherein the adhesive bonds to vinyl constructions under low heat conditions.

12. The plasticizer-free water-based adhesive according to claim 11, wherein the adhesive bonds to vinyl constructions under low heat conditions and under a vacuum.

13. An article comprising:
   (a) a substrate,
   (b) a layer of a plasticizer-free water based adhesive according to claim 1 coated onto the substrate, and
   (c) a sheeting adhered to the substrate with the adhesive layer.

14. The article according to claim 13 wherein
   the substrate is a polyphenylene oxide modified with high impact styrene, and
   the sheeting is a vinyl sheeting.

* * * * *

UNITED STATES PATENT AND TRADEMARK OFFICE
CERTIFICATE OF CORRECTION

PATENT NO. : 6,180,244 B1
APPLICATION NO. : 09/024237
DATED : January 30, 2001
INVENTOR(S) : Terry J. Rayner It is certified that error appears in the above-identified patent and that said Letters Patent is hereby corrected as shown below:

Column 3,
Line 12, delete "theological" and insert in place thereof --rheological--.

Column 6,
Lines 15 and 16, delete "ASB-95NP" and insert in place thereof --ASE– 95NP--.

Column 10, Table 1a,
Line 58, delete "Nory" and insert in place thereof --Noryl--.

Column 11,
Line 35, delete "all".

Column 12, Table 2c,
Line 44, delete "1800" and insert in place thereof --180°--.

Column 12, Table 2d,
Lines 58 and 59, delete "Exam-8" and insert in place thereof --Example 8--.
Lines 58 and 59, delete "Exam-9" and insert in place thereof --Example 9--.

Column 13, Table 2e,
Line 19, delete "Component" and insert --Component-- on Line 18 as Column Title.
Line 19, insert underlining under "VK9 Vinyl to ABS" to emphasize as Column Title.

Signed and Sealed this

Twenty-fifth Day of December, 2007

JON W. DUDAS
*Director of the United States Patent and Trademark Office*